United States Patent [19]

Baugh et al.

[11] Patent Number: 4,673,313
[45] Date of Patent: Jun. 16, 1987

[54] MARINE PRODUCTION RISER AND METHOD FOR INSTALLING SAME

[75] Inventors: Benton F. Baugh, Houston; Narayana N. Panicker, Dallas, both of Tex.

[73] Assignee: Mobil Oil Corporation, New York, N.Y.

[21] Appl. No.: 722,026

[22] Filed: Apr. 11, 1985

[51] Int. Cl.[4] .............................................. E21B 7/12
[52] U.S. Cl. .................................... 405/195; 166/341; 405/191
[58] Field of Search ............... 405/185, 188, 190, 191, 405/195, 224, 169; 166/338, 341, 342, 350, 359, 367

[56] References Cited

U.S. PATENT DOCUMENTS

| | | | |
|---|---|---|---|
| 3,458,853 | 7/1969 | Daniels et al. | 166/341 X |
| 4,167,215 | 9/1979 | Thorne | 166/341 |
| 4,182,584 | 1/1980 | Panicker et al. | 405/195 |
| 4,214,842 | 7/1980 | Franks | 405/191 |
| 4,367,055 | 1/1983 | Gentry et al. | 405/169 |
| 4,398,846 | 8/1983 | Agdern | 405/185 |
| 4,400,109 | 8/1983 | Gentry et al. | 405/195 |
| 4,423,984 | 1/1984 | Panicker et al. | 405/195 |
| 4,442,900 | 4/1984 | Padilla et al. | 166/342 |

Primary Examiner—David H. Corbin
Attorney, Agent, or Firm—Alexander J. McKillop; Michael G. Gilman; Charles J. Speciale

[57] ABSTRACT

A riser connector system for securing a marine riser to a marine bottom. The system is comprised of a landing base which is preset on the marine bottom and a connector means which is connected to the lower end of the core of the riser. The landing base has an inverted 45° cone-shaped cover plate which overlies and protects connector heads on the base. The cover plate has openings therethrough in vertical alignment with the connector heads which are normally closed by spring-biased doors to prevent trash from accumulating in the heads. The connector means has an inverted cone-shaped funnel which is adapted to cooperate with the cover plate when assembled and has flowline guidelines therethrough vertically aligned with the openings in the cover plate. A target on the underside of the connector means is viewed by a TV camera positioned on the base to orient the riser during assembly.

13 Claims, 9 Drawing Figures

MARINE PRODUCTION RISER AND METHOD FOR INSTALLING SAME

TECHNICAL FIELD

The present invention relates to a marine riser and a method for installing same and more particularly relates to a riser bottom connector system for securing the lower end of a marine riser to the marine bottom.

BACKGROUND ART

A critical consideration in the production of fluid hydrocarbons from marine deposits lies in providing a fluid communication system from the marine bottom to the surface after production has been established. Such a system, commonly called a production riser, ususally includes multiple conduits through which various produced fluids are transported to and from the surface, including oil and gas production lines, service, electrical and hydraulic control lines.

For offshore production, a floating facility can be used as a production and/or storage platform. Since the facility is constantly exposed to surface and sub-surface conditions, it undergoes a variety of movements. In such a zone of turbulence, heave, roll, pitch, drift, etc., may be caused by surface and near surface conditions. In order for a production riser system to function adequately with such a facility, it must be sufficiently compliant to compensate for such movements over long periods of operation without failure.

Examples of such compliant marine riser systems are disclosed and discussed in U.S. Pat. Nos. 4,182,584; 4,367,055; 4,400,109; and 4,423,984; and in paper OTC 4512, "Deepwater Production Riser", Panicker and Yancey, presented at the 15th annual Offshore Technology Conference, Houston, Tex., May 2–5, 1983. As seen from these references, a typical compliant riser system includes (1) a vertically rigid section which extends from the marine bottom to a fixed position below the zone of turbulence that exists near the surface of the water, and (2) a flexible section which is comprised of flexible flowlines that extend from the top of the rigid section, through the turbulent zone, to a floating vessel on the surface. A submerged buoy is attached to the top of the rigid section to maintain the rigid section in a substantially vertical position within the water.

Due to the water depths in those production areas where compliant riser systems are designed to be used, difficulties arise in securing the lower end of the rigid section to the marine bottom in that at the depths involved, any substantial use of divers in the installation is impractical, if not impossible. Further, the depths are such that the use of guidelines for installing the riser and/or lower components thereof is severely limited. Accordingly, the lower end of the rigid section must be capable of being remotely installed without any substantial assistance from divers or without the aid of guidelines to the surface.

DISCLOSURE OF THE INVENTION

The present invention provides a riser bottom connector system for securing the lower end of a marine riser to the marine bottom which can be remotely installed without any substantial use of divers or the use of guidelines.

More specifically, the riser bottom connector system of the present invention is comprised of a preset landing base and a riser connector assembly which is adapted to be attached to the lower end of the rigid section of a marine riser. The landing base is preset onto the marine bottom and is comprised of a template having one or more completion heads thereon. The production from one or more subsea wells is completed to each of the completion heads on the template and will flow therethrough.

Also affixed to said template at or near the center thereof is a landing mandrel which, in turn, is adapted to provide the major stength component for latching the riser bottom connector assembly of the marine riser to the template. A cover plate in the shape of an inverted cone is attached to the landing mandrel and extends outward therefrom to cover the connector heads on the underlying template. The cover plate protects the connector heads during installation of the riser.

Openings are provided through the cover plate and each is vertically aligned with a respective connector head whereby a vertically-extending flowline can pass through its respective opening in the cover plate and be stabbed or otherwise connected to its respective connector head on the template. To prevent any accumulation of trash and debris in or on the connector heads before flowlines are connected thereto, doors are hingedly mounted over each of the openings in the cover plate and are normally biased to a closed position by a spring or the like. The tension of these springs are sufficient to keep a respective door closed until the contact of a downwardly moving flowline opens the door to allow the flowline to pass through opening. Two guide posts extend upward from the template to a point above the cover plate and are positioned so as not to lie diametrically-opposed to each other.

A receptacle is provided on the template and is adapted to receive and position a remotely-operated television (TV) camera on the template so that the camera is directed and will view vertically upward. The cover plate is cut-out over the receptacle so that the view of the camera is unobstructed when the camera is in position on the template. The camera is preferably adapted to be positioned onto the template by a remotely-operated vehicle (ROV) after the template has been set on the marine bottom and production has been completed to the connector heads.

The riser connector assembly of the present invention is comprised of a hydraulic connector which is attached to the lower end of the core section of a marine riser. Depending downward and outward from the lower end of the hydraulic connector is an inverted funnel which conforms generally to the inverted cone configuration of the cover plate. The inverted funnel and cover plate are used in orienting and aligning the template and riser. Two guide openings are positioned at the outer periphery of the funnel and are aligned to receive the guide posts on the template to properly orientate the lower end of the rider with the landing base during the final stage of installation. By the guide posts and guide openings not being diammetrically-oppossed to each other, there is only one position that riser bottom connector assembly can be received onto the template.

To assemble the riser bottom connector system of the present invention, the landing base is positioned on the marine bottom and production from one or more subsea wells is connected to the connector heads on the template. The cover plate protects the connector heads from inadvertent damage if there might be a delay in completing the riser installation after the base is installed and also, by means of the hinged doors, prevents any substantial accumulation of debris in the collector heads which would otherwise interfere with flowline installation. When it is time to affix the lower section of the riser to the base, a TV camera is positioned onto the template by an ROV. The camera views the underside of the funnel of the riser connector assembly as it is lowered by the riser. In the present invention, a target of a specific pattern is painted or otherwise imprinted on the lower surface of the funnel and by manipulating the riser from the surface, the target being telecast by the camera is aligned to a desired orientation on a TV screen at the surface thereby informing an operator that the riser is within prescribed tolerances for a successful mating with the base.

The riser connector assembly is then lowered and the guide posts on the template will cooperate with the guide openings on the funnel to complete the proper orientation. The hydraulic connector is then actuated to latch the riser core to the landing mandrel on the template thereby securing the riser connector assembly to the landing base. The TV camera can then be removed by an ROV or the like if desired.

Flowlines, which pass through flowline guides spaced along and around the riser core, are then lowered to contact and open the doors on the cover plate and are stabbed or otherwised connected to respective connector heads on the template thereby completing the installation of the riser connector system.

BRIEF DESCRIPTION OF THE DRAWINGS

The actual construction, operation, and apparent advantages of the present invention will be better understood by referring to the drawings in which like numerals identify like parts and in which.

BEST MODE FOR CARRYING OUT THE INVENTION

Figure 1:
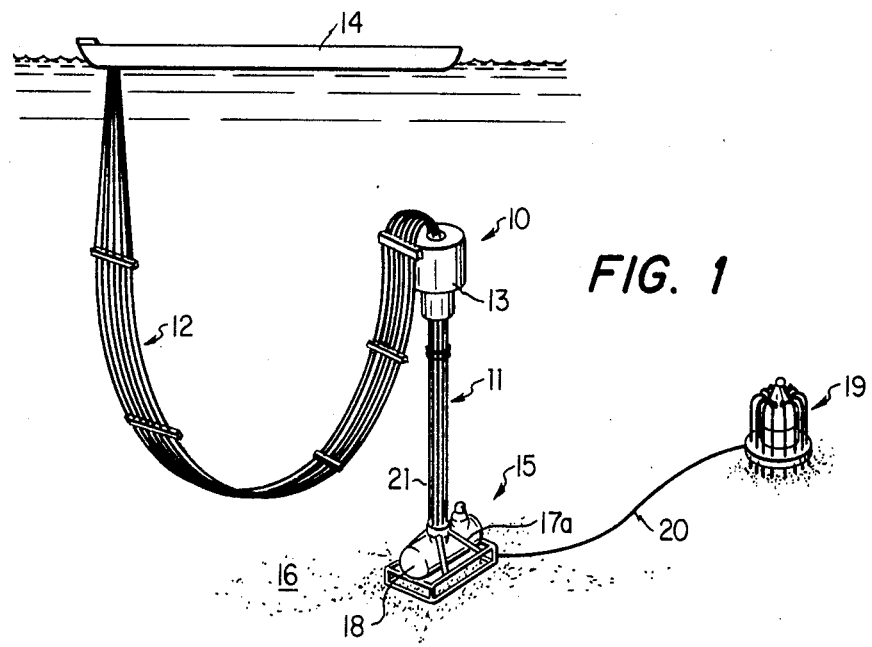
FIG. 1 is a perspective view of a typical compliant marine riser in an operable position at an offshore production area.

Referring more particularly to the drawings, FIG. 1 discloses a typical compliant marine riser system 10 in an operable position at an offshore location. Riser system 10 is comprised of a lower rigid section 11 and an upper flexible section 12. Flexible section 12 is comprised of one or more flexible conduits which connect to respective flow passages in or on rigid section 11 and which extend from buoy 13 to the surface of the water where they are connected to floating facility 14.

Rigid section 11 is affixed to a base 15 which in turn is preset on marine bottom 16. As illustrated base 15 includes a platform structure 17a, (sometimes called a "strongback") which is positioned over and spans subsea production equipment 18, e.g. a subsea atmospheric riser manifold (SARM) such as disclosed in U.S. Pat. No. 4,398,846, incorporated herein by reference. The production from one or more subsea wells 19 is connected to SARM 18 by submerged flowline 20 for production through riser. Now that a typical compliant marine riser has been briefly described, the present invention will now be described which is directed to a new and improved bottom connector system for securing the lower end of the marine riser to the marine bottom.

Figure 2:
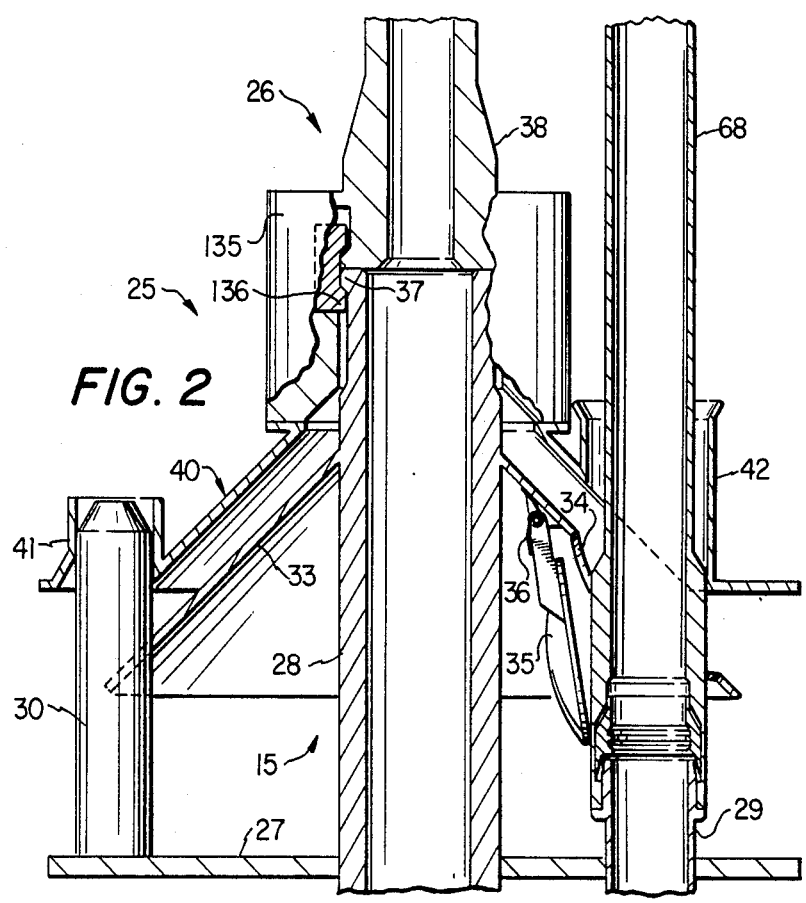
FIG. 2 is a sectional view of the riser connector system of the present invention in assembled position.
Figure 3:
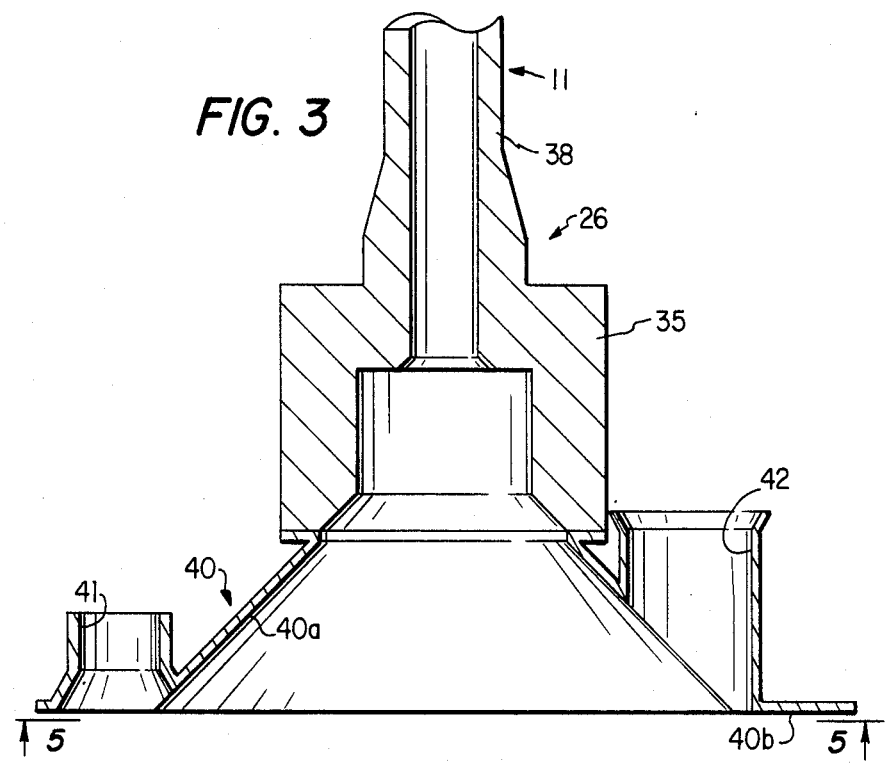
FIG. 3 is a sectional view of the riser connector assembly of the present invention.
Figure 4:
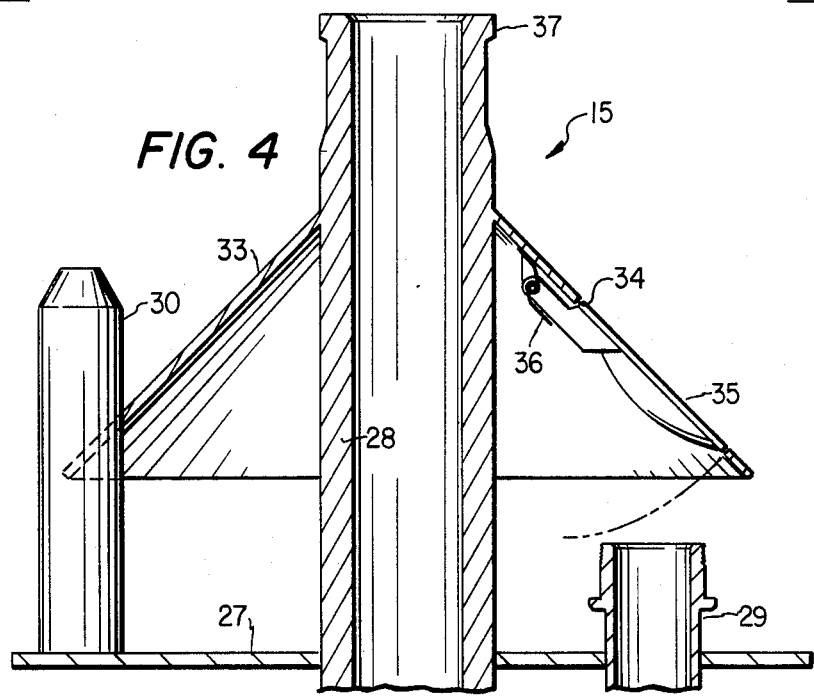
FIG. 4 is a sectional view of the landing base of the present invention.
Figure 5:
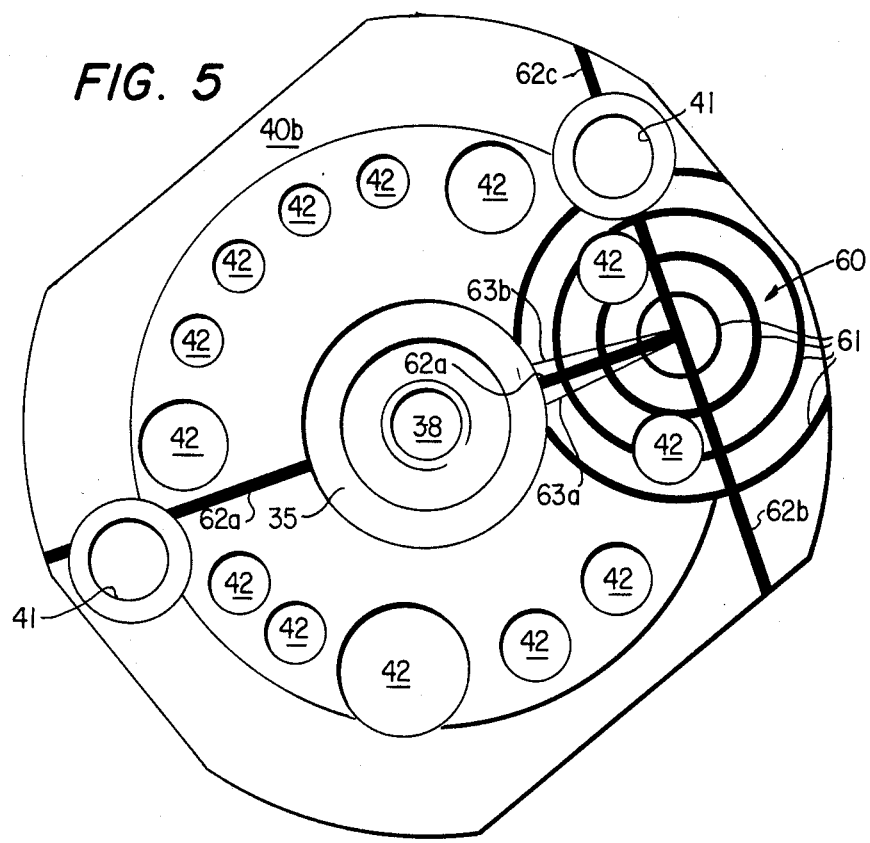
FIG. 5 is a plan view taken along line 5—5 of FIG. 3.

Referring now to FIGS. 2–4, riser bottom connector system 25 of the present invention is comprised of landing base 15 and a connector assembly 26. Landing base 15 is comprised of a base template 27, which, as discussed above, can be the upper platform 17a of a "strongback" overlying subsea equipment such as SARM 18 in FIG. 1 or template 27 may be a separate element of structure preset and secured directly to marine bottom 18.

Landing mandrel 28 is secured at or near the center of template and extends vertically upward therefrom. In those instances where template is a separate element of structure, landing mandrel 28 may also extend through template 27 and into the marine bottom to aid in anchoring template 27 in place (not shown). Mandrel 28 functions primarily as the major strength component for latching the lower end of the riser to base 15 but, if mandrel is hollow as illustrated, it should be understood that it could also provide a separate flowpath or be adapted to have one or more separate conduits (not shown) pass therethrough which would cooperate with respective flowpaths in riser section.

Figure 6:
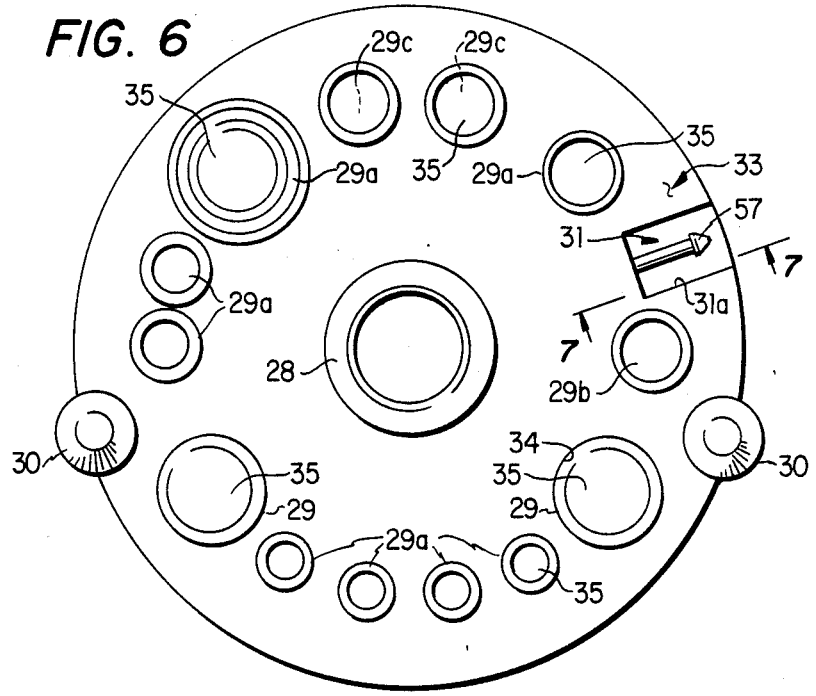
FIG. 6 is a plan view taken along line 6—6 of FIG. 4.

Spaced around template 27 are one or more peripheral conduit connector heads 29 (see FIGS. 2–4 and 5). Each connector head 29 is connected to a source of production or to a subsea control and/or supply means as will be understood in the art. As viewed in FIG. 6, connector heads can be of different diameters depending on a particular production scheme; e.g. connector heads 29a are connected to production flowlines of various diameters while head 29b could be connected to control and/or supply equipment.

Mounted on and extending outwardly therefrom is cover plate 33 which has the shape of an inverted cone (preferably a 45° cone). Cover plate 33 is positioned so that mandrel 28 will pass through the apex thereof and so that it will extend out over and cover the connector heads 29, 29a, 29b on template 27. A plurality of openings 34 are provided in cover plate 33 and are positioned so that one of said openings will be vertically aligned with one of the connector heads. A protective covering, e.g. door 35, is hingedly mounted to cover plate 33 at each opening 34 to open and close same. Each door 35 has a means (e.g. spring 36) to normally bias the doors to their closed positions.

Figure 7:
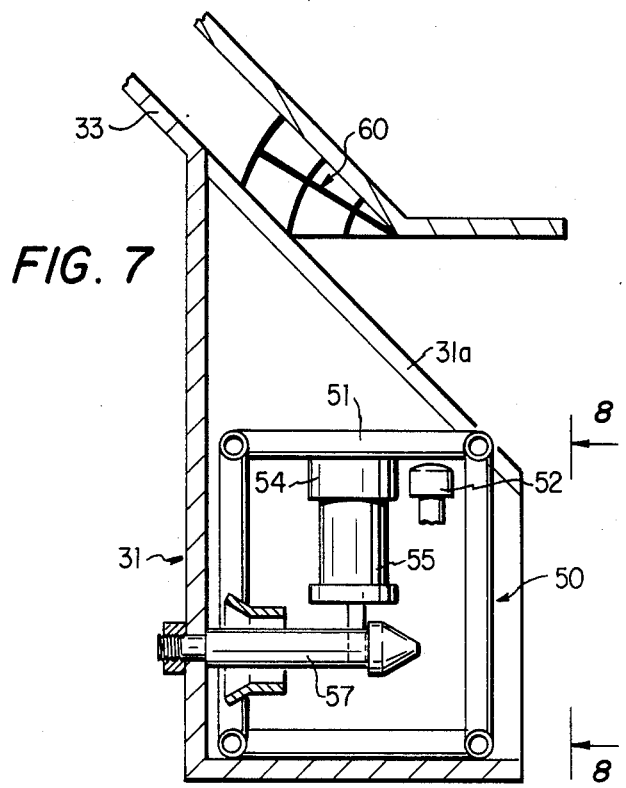
FIG. 7 is a sectional view taken along line 7—7 of FIG. 6.
Figure 8:
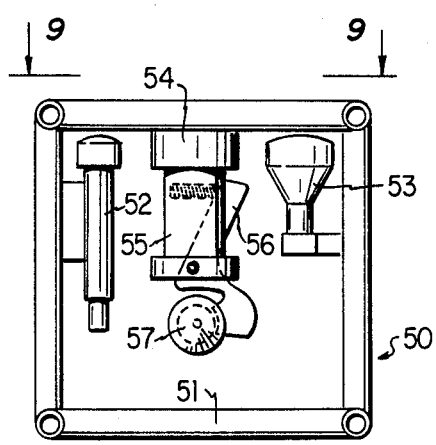
FIG. 8 is a view of the TV package along line 8—8 of FIG. 7.
Figure 9:
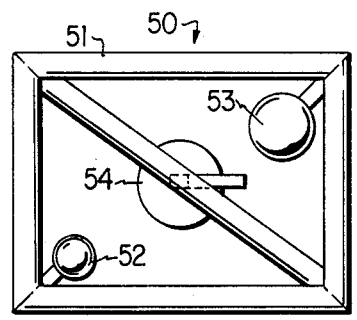
FIG. 9 is a view taken along line 9—9 of FIG. 8.

Two guide posts 30 are affixed to template 27 and extend vertically upward through cover plate 33. Posts 30 are positioned so as not to lie diametrically-opposed to each other on template 27 (i.e. do not lie on a common diameter) for a purpose to be discussed below. Also mounted on template 27 is a receptacle 31 adapted to receive a remote television (TV) camera assembly 50 (FIGS. 7-9) as will be described in more detail below. A window 31a is cut or otherwise provided in cover plate 33 to overlie TV camera receptacle 31 (FIG. 6) to allow unobstructed TV viewing in a vertical direction from template 27.

Connector assembly 26 (FIGS. 2, 3, and 5) is adapted to be connected onto the bottom of the riser core 38 of rigid section 11 of compliant riser system 10. Connector assembly is comprised of a hydraulic connector 135 which is adapted to be received over mandrel 28 and cooperate therewith to secure riser core 38 to template 27. Hydraulic connector 135 has been shown schematically since the details thereof form no part of the present invention but will be understood by those familiar with the art as the type of many readily commercially-available connectors (e.g. those used on BOP stacks) which have dogs 136 or the like that are set hydraulically to latch onto flange 37 or the like on mandrel 28.

Depending from connector 135 and affixed thereto is an inverted funnel 40, (preferably 45° cone) having a sloping surface 40a and a flat, annular peripheral flat surface 40b. Funnel 40 conforms substantially to the dimensions of cover plate 33 so that funnel 40 effectively fits over cover plate 33 when in an assembled position. The use of inverted funnel 40 and cover plate 33 to orient and assembly the riser or for "re-entry" if the riser is removed and reassembled differs from most other known "re-entry" or connector assemblies of this type since in the previously known assemblies, the funnel is positioned in a normal as opposed to an inverted position. That is, in most known previous systems the large opening in the funnel faces upward to provide a larger target or "catcher" for the lower end of the riser as it is lowered therein. A plurality of vertically-extending flowline guide openings 42 are positioned on funnel 40 so as to be aligned with respective openings 34 in cover plate 33 and hence, connector heads 29 on template 27, when connector assembly 26 is assembled on base 15.

Two guide receiver openings 41 (preferably tapered at their lower ends) are affixed to the periphery of funnel 40 and are positioned to receive guide posts 30 when bottom connector assembly 26 is lowered onto base 15. Since both the posts 30 and guides receivers 41 are not diametrically-opposed, it can be seen (FIGS. 5 and 6) that there is only one orientation possible between the riser and the base and accordingly, there can be no inadvertent misorientation of the riser onto the base when they are assembled. However, in order for posts 30 to effect the final orientation, connector assembly 26 must be first manipulated from the surface to align assembly 26 to within plus or minus 5° from its desired, final orientation with respect to base 15. How this is done will be explained below.

To assemble riser bottom connector system 25 of the present invention, landing base 15 is set on marine bottom 16 and production line 20 along with associated hydraulic and other control lines, not shown are completed on marine bottom 16 from subsea wells 19 to the respective connector heads 29 on template 27. Next, connector assembly 26 is lowered on the lower end of riser core 38 to a position approximately 30 feet directly over base 15. Using a remotely-operated vessel (ROV), i.e. a small submersible, remotely controlled vessel having manipulator arms which are well known in subsea operations, a remote television (TV) camera assembly or package 50 (FIGS. 7-9) is positioned into receptacle 31 on template 27.

Package 50 is comprised of a frame 51 having a TV camera 52 and a light 53 mounted thereon so as to point vertically upward when package 50 is in position. Also, mounted on frame 51 is latch means 54. As a manipulator arm (not shown) of the ROV grips the holding surface 55 of latch 54, it will force the upper part of latch element 56 inwardly against spring pressure to move the latch to an open position. Once the frame 51 is moved onto the retaining rod 57 of receptacle 31, the manipulator arm is released and the spring pressure biases latch element 56 to a closed position to latch package 50 to receptacle 31. The TV camera 52 and light 53 may be battery-powered or powered by an umbical cord from the ROV.

Riser core 38 with assembly 26 thereon is now lowered to a point approximately 10 feet above base 15. At this point, the final lowering and orientation is carried out by using TV camera 52 to view a specially-designed target 60 (FIG. 5) painted or otherwise imprinted on the lower surfaces 40a, 40b of funnel 40. While other patterns can be used for target 60, preferably the target is formed of four concentric, circles 61 on 6 inch spacing (outermost circle having a 24 inch diameter) with the center of the circles positioned to directly overlie the TV camera 52 when the riser is properly assembled on the base. Three heavy bars 62a, 62b, 62c are provided on the lower surface of funnel 40 which all extend from the center of circles 61. Two bars 62b, 62c will be horizontal and one bar 62a will be vertical when the riser is correct orientation. Two narrow lines 63a, 63b, are provided, one or either side of vertical bar 52a to indicate the limits of angular tolerances (e.g. plus or minus 5°) that can be compensated for by the guide posts 30. When viewing the picture being transmitted from TV camera 52, if the center of the viewing screen is anywhere within the four circles 61 and if true vertical on the screen is within narrow lines 63a, 63b, the system is oriented adequately for final assembly.

Once oriented, connector assembly 26 is lowered onto landing mandrel 28 and connector 35 is actuated to secure the two together. Next, flowlines 68 (only one shown in FIG. 2) which passed through guides spaced on riser core 38, are lowered through their respective flowline guides 42 on funnel 40 and into contact with a door 35 on a respecting opening 34 in cover plate 33. Continued downward movement of flowline 68 will cause door 35 to open whereby flowline 68 can be stabbed into and/or otherwise connected to its respective connector head 29. Once all flowlines or control lines 68 are connected to their respective connector heads, the assembly is complete. TV package 50 can be removed by the ROV or can be left in place, if desired.

The individual flowlines 68 can be removed and replaced whenever desired and the riser core 38 can be removed and replaced if and when the need arises.

What is claimed is:

1. A riser bottom connector system for connecting the lower end of a marine riser to the marine bottom, said system comprising:
 a landing base adapted to be set on said marine bottom, said base comprising:
 a template;
 at least one connector head on said template adapted to be connected to the production from a subsea well;
 a landing mandrel attached to and extending vertically upward from said template and;
 an inverted cone cover plate attached through its apex to said landing mandrel and extending outward and downward therefrom whereby said cover plate overlies said at least one connector head; said cover plate having at least one opening therethrough which is vertically aligned over said at least one connector head.

2. The riser bottom connector system of claim 1 including:
   a door;
   means for pivotably mounting said door over said at least one opening in said cover plate; and
   means for normally biasing said door to a closed position with respect to said opening.

3. The riser connector system of claim 2 including:
   two guide posts attached near the periphery of said template and extending vertically upward therefrom through said cover plate.

4. The riser connector system of claim 3 wherein said two posts are spaced from each other but are not diametrically-opposed with respect to each other.

5. The riser connector system of claim 4 including:
   a receptical positioned on said template and adapted to received a remotely-operated television camera; and
   wherein said cover plate has an opening therethrough which aligns vertically with said receptacle on said template.

6. A riser bottom connector system for connecting the lower end of a marine riser to the marine bottom, said system comprising:
   a landing base adapted to be set on said marine bottom, said base comprising:
   a template;
   at least connector head on said template adapted to be connected to the production from a subsea well;
   a landing mandrel attached to and extending vertically upward from said template; and
   a cover plate attached to said landing mandrel and extending outward therefrom whereby said cover plate overlies said at least one connector head; said cover plate having at least one opening therethrough which is vertically aligned over said at least one connector head;
   a connector assembly comprising;
   connector means adapted to be connected to the lower end of a core of said marine riser and adapted to be received by and connected to said landing mandrel for securing said core of said riser to said landing base;
   wherein said cover plate is formed as an inverted cone with said mandrel passing through the apex thereof and the surface of said cover plate extending outward and downward from said mandrel, and
   wherein said connector means includes:
   an inverted, cone funnel attached to and extending outward and downward from said connector means, said funnel being substantially the same size and shape as said cover plate and adapted to be received over said cover plate when said connector means is connected to said base; and
   at least one flow line guide opening through said funnel and positioned to be vertically aligned with said at least one opening in said cover plate when said connector means is properly oriented on said base.

7. The riser bottom connector system of claim 6 including:
   a door;
   means for pivotably mounting said door over said at least one opening in said cover plate; and
   means for normally biasing said door to a closed position with respect to said opening.

8. The riser connector system of claim 7 including:
   two guide posts attached near the periphery of said template and extending vertically upward therefrom through said cover plate; and
   two guide receiver openings through said funnel and positioned to be vertically aligned over and adapted to receive said guide posts on said template.

9. The riser connector system of claim 8 wherein said two posts are spaced from each other but are not diametrically opposed with respect to each other.

10. The riser connector system of claim 9 including:
    a receptacle positioned on said template and adapted to receive a remotely-operated television camera; and
    wherein said cover plate has an opening therethrough which aligns vertically with said receptacle on said template.

11. The riser connector system of claim 10 including:
    a remotely-operated television camera mounted on said receptacle on said template.

12. The riser connector system of claim 11 including:
    a target on the underside of said funnel and positioned to be viewed by said television camera as said connector means is lowered toward said landing base to thereby orient said connector means in relation to said landing base.

13. A method of assembling a marine riser onto a landing base which has been preset on a marine bottom; said method comprising:
    positioning a remotely-operated television camera on said landing base in a position where said camera is pointed vertically upward;
    providing a target on the lower end of said marine riser which is capable of being viewed by said television camera on said riser is lowered; and
    viewing said target from said landing base as said riser is lowered; and
    manipulating said riser from the surface as it is being lowered to align said target with respect with a viewing screen to properly orient said riser with respect to said landing base.

* * * * *